(12) United States Patent
Kim et al.

(10) Patent No.: US 7,959,842 B2
(45) Date of Patent: Jun. 14, 2011

(54) CARBON NANOTUBE STRUCTURE

(75) Inventors: Yong Hyup Kim, Seoul (KR); Eui Yun Jang, Seoul (KR)

(73) Assignee: SNU & R&DB Foundation, Seoul (KR)

( * ) Notice: Subject to any disclaimer, the term of this patent is extended or adjusted under 35 U.S.C. 154(b) by 0 days.

(21) Appl. No.: 12/198,835

(22) Filed: Aug. 26, 2008

(65) Prior Publication Data
US 2010/0055338 A1    Mar. 4, 2010

(51) Int. Cl.
B28B 1/38 (2006.01)
(52) U.S. Cl. ........ 264/306; 264/301; 425/270; 425/273; 425/198
(58) Field of Classification Search .......... 425/270, 425/273, 198; 264/301, 306, 313, 317
See application file for complete search history.

(56) References Cited

U.S. PATENT DOCUMENTS

| | | | |
|---|---|---|---|
| 4,841,786 A * | 6/1989 | Schulz | 73/864.25 |
| 5,763,879 A | 6/1998 | Zimmer et al. | |
| 5,948,360 A * | 9/1999 | Rao et al. | 422/65 |
| 6,781,166 B2 | 8/2004 | Lieber et al. | |
| 6,905,667 B1 | 6/2005 | Chen et al. | |
| 7,147,894 B2 * | 12/2006 | Zhou et al. | 427/256 |
| 7,164,209 B1 | 1/2007 | Duan et al. | |
| 7,385,295 B2 | 6/2008 | Son et al. | |
| 2002/0014667 A1 | 2/2002 | Shin et al. | |
| 2002/0069505 A1 | 6/2002 | Nakayama et al. | |
| 2002/0127162 A1 | 9/2002 | Smalley et al. | |
| 2004/0265550 A1 | 12/2004 | Glatkowski et al. | |
| 2006/0060825 A1 | 3/2006 | Glatkowski | |
| 2006/0099135 A1 * | 5/2006 | Yodh et al. | 423/447.1 |
| 2006/0274048 A1 | 12/2006 | Spath et al. | |
| 2007/0007142 A1 | 1/2007 | Zhou et al. | |
| 2007/0014148 A1 | 1/2007 | Zhou et al. | |
| 2007/0020458 A1 * | 1/2007 | Su et al. | 428/408 |
| 2007/0045119 A1 * | 3/2007 | Sandhu | 205/89 |
| 2007/0248528 A1 | 10/2007 | Kim | |
| 2008/0044651 A1 | 2/2008 | Douglas | |
| 2008/0044775 A1 | 2/2008 | Hong et al. | |
| 2008/0048996 A1 | 2/2008 | Hu et al. | |
| 2008/0290020 A1 | 11/2008 | Marand et al. | |
| 2009/0059535 A1 * | 3/2009 | Kim et al. | 361/710 |

FOREIGN PATENT DOCUMENTS

DE   69728410 T2   12/1998
KR   1020070112733   11/2007

OTHER PUBLICATIONS

Goldstein et al., "Zero TCR Foil Resistor Ten Fold Improvement in Temperature Coefficient", Electronic Components and Tech. Conf., IEEE, 2001.

Hulman et al., The dielectrophoretic attachment of nanotube fibres on tungsten needles, Mar. 6, 2007, Nanotechnology, 18, 1-5.

Im, et al., "Directed-assembly of Single-walled Carbon Nanotubes Using Self-assembled Monolayer Patterns Comprising Conjugated Molecular Wires," *Nanotechnology*, (2006) vol. 17: pp. 3569-3573.

(Continued)

*Primary Examiner* — Joseph S Del Sole
*Assistant Examiner* — David N Brown, II
(74) *Attorney, Agent, or Firm* — Knobbe, Martens, Olson & Bear, LLP

(57) ABSTRACT

Techniques for forming a carbon nanotube (CNT) structure are disclosed.

27 Claims, 8 Drawing Sheets

OTHER PUBLICATIONS

International Search Report dated Mar. 5, 2009 for corresponding PCT Application No. PCT/KR2008/007144 filed Dec. 3, 2008.
International Written Opinion dated Mar. 5, 2009 for corresponding PCT Application No. PCT/KR2008/007144 filed Dec. 3, 2008.
Jiang et al., "Spinning continuous carbon nanotube yarns", Nature, vol. 419, 801 (2002).
Kaempgen et al., "Transparent carbon nanotube coatings," Applied Surface Science 252; pp. 425-429 (2005).
Kang et al., "Sandwich-Type Laminated Nanocomposites Developed by Selective Dip-Coating of Carbon Nanotubes", Adv. Mater., 19, 427-432 (2007).
Ko et al., "Electrospinning of Continuous Carbon Nanotube-Filled Nanofiber Yarns", Adv. Mater., 15, No. 14, pp. 1161-1165 (2003).
Kumar et al., "Search for a novel zero thermal expansion material: dilatometry of the AgI-CuI system", J. Mater Sci. 41, pp. 3861-3865 (2006).
Kwon et al., "Thermal Contraction of Carbon Fullerenes and Nanotubes", Phy. Rev. Lett., vol. 92, No. 1, pp. 015901-015904 (2004).
Kwon, "Computational Modeling and Applications of Carbon Nanotube Devices", NSI Workshop Series—IV, Jul. 11, 2007.
Lee et al., "Linker-free directed assembly of high-performance integrated devices based on nanotubes and nanowires", Nature Nanotechnology, vol. 1, pp. 66-71, Oct. 2006.
Lewenstein, et al., "High-yield Selective Placement of Carbon Nanotubes on Pre-patterned Electrodes," *NanoLetters*, (2002) vol. 2, Issue (5): pp. 443-446.
Li et al., "Direct Spinning of carbon Nanotube Fibers from Chemical Vapor Deposition Synthesis", Science, vol. 304, 276-278 (2004).
Liu et al., "Controlled deposition of individual single-walled carbon nanotubes on chemically functonalize templates," Chemical Physicas Letters, Apr. 2, 1999, 303, 125-129.
Liu et al., "Controlled Growth of Super-Aligned Carbon Nanotube Arrays for Spinning Continuous Unidirectional Sheets with Tunable Physical Properties", Nano Letters, vol. 8, No. 2, pp. 700-705 (2008).
Ma et al., "Directly Synthesized Strong, Highly Conducting, Transparent Single-Walled Carbon Nanotube Films", Nano Letters, vol. 7, No. 8, pp. 2307-2311 (2007).
Nakagawa, et al., "Controlled Deposition of Silicon Nanowires on Chemically Patterned Substrate by Capillary Force Using a Blade-coating Method," *J. Phys. Chem.*, (2008) vol. 112: pp. 5390-5396.
Rao et al., "Large-scale assembly of carbon nanotubes", Nature, vol. 425, pp. 36-37, Sep. 4, 2003.
Wang et al., "Controlling the shape, orientation, and linkage of carbon nanotube features with nano affinity templates", PNAS, vol. 103, No. 7, pp. 2026-2031 (2006).
Zhang et al., "Multifunctional Carbon Nanotube Yarns by Downsizing an Ancient Technology", Science, vol. 306, 1358-1361 (2004).
Office Action dated Sep. 18, 2009 from U.S. Appl. No. 12/195,347, filed Aug. 20, 2008.
Office Action dated Jan. 28, 2010 from U.S. Appl. No. 12/195,347, filed Aug. 20, 2008.
Office Action dated Jun. 30, 2009 from U.S. Appl. No. 12/192,024, filed Aug. 14, 2008.
Office Action dated Oct. 19, 2009 from U.S. Appl. No. 12/192,024, filed Aug. 14, 2008.
Office Action dated May 7, 2010 from U.S. Appl. No. 12/192,024, filed Aug. 14, 2008.
Office Action dated Aug. 24, 2010 from U.S. Appl. No. 12/192,024, filed Aug. 14, 2008.
Office Action dated Mar. 24, 2009 from U.S. Appl. No. 12/198,815, filed Aug. 26, 2008.
Office Action dated Oct. 28, 2009 from U.S. Appl. No. 12/198,815, filed Aug. 26, 2008.
Office Action dated May 17, 2010 from U.S. Appl. No. 12/198,815, filed Aug. 26, 2008.
Annamalai, et al., "Electrophoretic drawing of continuous fibers of single-walled carbon nanotubes," *J. Appl. Phys.*, 98 114307-1 through 114307-6 (2005).
Brioude, et al., "Synthesis of sheathed carbon nanotube tips by the sol-gel technique," Applied Surface Science, 221, 2004, pp. 4-9.
Dong, et al., "Synthesis, assembly and device of 1-dimentional nanostructures," *Chinese Science Bulletin*, 47(14), 2002, pp. 1149-1157.
Kornev, et al., "Ribbon-to-Fiber Transformation in the Process of Spinning of Carbon-Nanotube Dispersion," *Physical Review Letters*, 97, 188303-1 through 188303-4, 2006.
Poulin, et al., "Films and fibers of oriented single wall nanotubes," *Carbon*, 40 (2002) pp. 1741-1749.
Tang, et al., "Assembly of 1D Nanostructures into Sub-micrometer Diameter Fibrils with Controlled and Variable Length by Dielectrophoresis," *Adv. Mater.*, 15, No. 16, pp. 1352-1355, 2003.
Office Action dated Jan. 6, 2011 from U.S. Appl. No. 12/192,024, filed Aug. 14, 2008.
Office Action dated Nov. 15, 2010 from U.S. Appl. No. 12/195,347, filed Aug. 20, 2008.
Office Action dated Dec. 8, 2010 from U.S. Appl. No. 12/198,815, filed Aug. 26, 2008.

\* cited by examiner

170

310

CARBON NANOTUBE STRUCTURE

BACKGROUND

Recently, carbon nanotubes (CNTs) have attracted interest in many research fields due to their mechanical, thermal and electrical properties. Although some progress has been made in the synthesis of the CNTs, a major challenge remains in the search for an effective means to bridging the gap between raw CNTs and engineering materials/structures. In particular, considerable efforts are being devoted to the development of CNT assemblies for transferring the properties of the CNTs to meso- or macro-scale structures.

SUMMARY

Techniques for forming carbon nanotube structures are provided. In one embodiment, an apparatus for forming a carbon nanotube (CNT) structure comprises a sacrificial element, a container configured to retain a CNT colloidal solution, and a manipulation unit configured to immerse the sacrificial element into the CNT colloidal solution and withdraw the sacrificial element therefrom so as to form a CNT structure on the sacrificial element, wherein the sacrificial element includes a material that is selectively separable from the CNT structure.

In another embodiment, a method for forming a carbon nanotube (CNT) structure comprises providing a CNT colloidal solution including CNTs, providing a sacrificial element, immersing the sacrificial element into the CNT colloidal solution to form a CNT structure on the sacrificial element, withdrawing the sacrificial element from the CNT colloidal solution, and separating the CNT structure from the sacrificial element.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

Figure 1A:
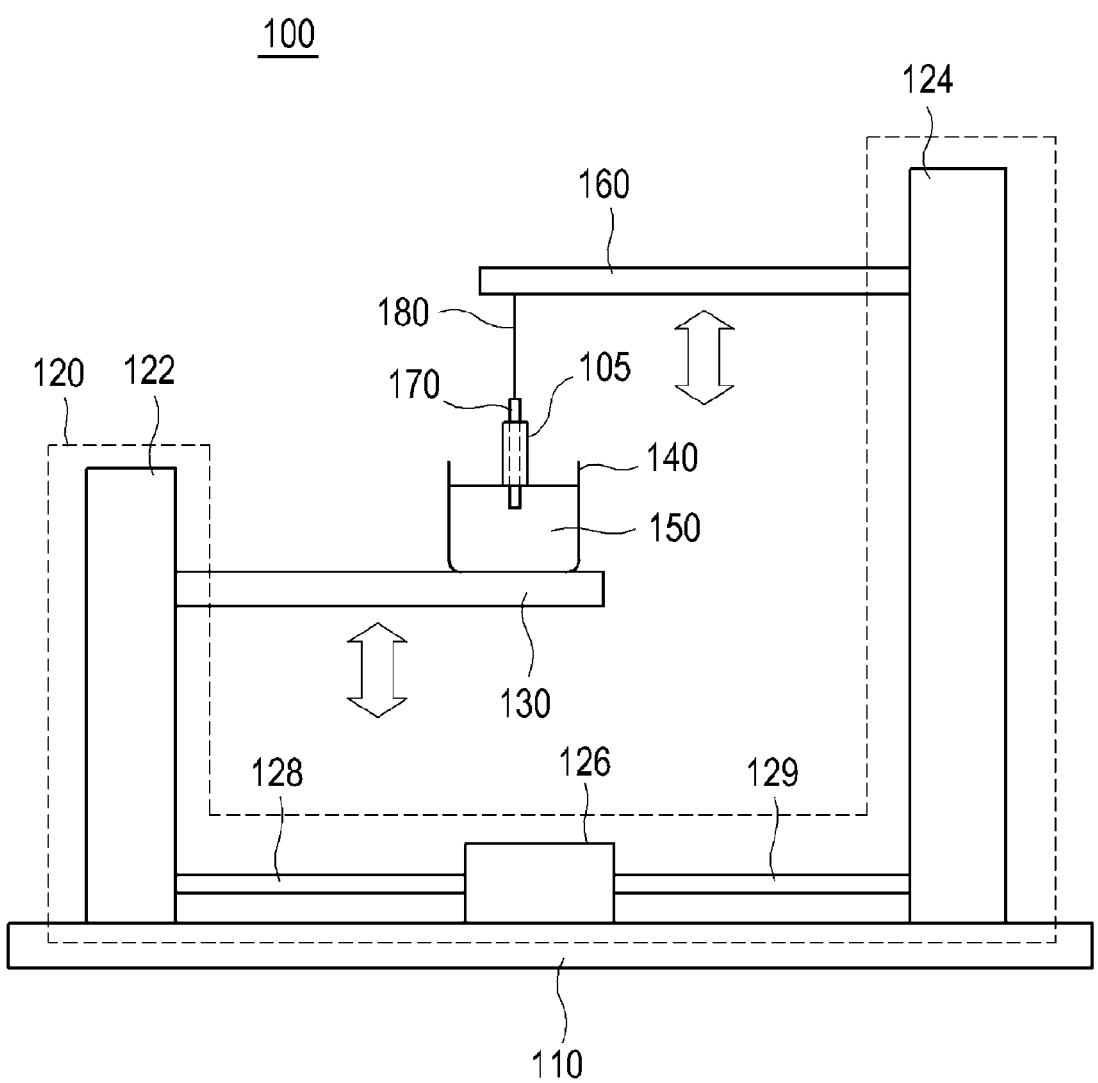
FIGS. 1A and 1B show illustrative embodiments of an apparatus for forming a CNT structure.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, among others, to apparatuses and methods relating to CNTs. CNTs may be assembled to form carbon nanotube structures. One of the CNT structures formed may be a CNT pipe composed of CNT networks that may be hollow and generally cylindrically shaped. Such a structure may generally have a space formed between CNTs and the middle thereof, and it may serve as a suitable structure for storage of molecular substances.

Referring to FIG. 1A, an illustrative embodiment of an apparatus 100 for forming a CNT structure 105 is shown. As depicted, apparatus 100 may include a base 110 and a manipulator 120 mounted on base 110. Manipulator 120 may include a left guide member 122 and a right guide member 124, each mounted on base 110. Manipulator 120 may also include a motor unit 126 coupled with left guide member 122 and right guide member 124. Motor unit 126 may be coupled to left guide member 122 and right guide member 124 via a first shaft 128 and a second shaft 129 respectively. Left guide member 122 and right guide member 124 may include gear mechanisms (not shown) and respective vertically arranged tracks (not shown) coupled to the gear mechanisms. The tracks may be integrally formed within left and right guide members 122 and 124, or may be formed as rails separably fitted within left and right guide members 122 and 124. The gear mechanisms may be operable to convert rotational movement of the first and second shafts 128 and 129 to vertical translational movement of the respective tracks. A supporting member 130 may be mounted to the respective track in left guide member 122 and configured to traverse vertically therealong. A container 140 may be coupled to supporting member 130 and configured to receive a CNT colloidal solution 150. A hanger 160 may be mounted to the respective track in right guide member 124 and configured to traverse vertically therealong. Hanger 160 may suspend a sacrificial element 170 via a holder 180. Sacrificial element 170 may be secured to holder 180 in a detachable manner.

Supporting member 130 may be configured to be movable substantially vertically with respect to left guide member 122 by operation of motor unit 126, first shaft 128 and left guide member 122, thereby causing container 140 to be disposed toward and/or away from sacrificial element 170. The gear mechanism of left guide member 122 may be configured to vertically dispose supporting member 130 by a belt-driven mechanism, direct connection to supporting member 130, and the like. Hanger 160 may also be configured to be movable substantially vertically with respect to right guide member 124 by operation of motor unit 126, second shaft 129 and right guide member 124, which may in turn cause sacrificial element 170 to be disposed substantially vertically toward container 140 having CNT colloidal solution 150 for immersion of sacrificial element 170 therein, and substantially vertically away from container 140 and CNT colloidal solution 150 for withdrawal of sacrificial element 170 therefrom. Supporting member 130 and hanger 160 may be, separately or simultaneously, raised and lowered respectively, by operation of motor unit 126, first and second shafts 128 and/or 129, left guide member 122 and/or right guide member 124, to allow for sacrificial element 170 to be selectively immersed in CNT colloidal solution 150.

The above has been provided for illustrative purposes and various modifications may be made without departing from the scope of claimed subject matter. For example, manipulation unit 120 may be configured to include one or both of first and second shafts 128 and 129. Left guide member 122 and supporting member 130 may remain fixed and stationary while allowing for manipulation and movement of right guide member 124 and hanger 160, and vice versa. Motor unit 126 may be controlled by a computer in response to a computer readable medium having instructions and programs stored thereon for the production of CNT structure 105 by selective immersion and withdrawal of sacrificial element 170 into and out of CNT colloidal solution 150. Motor unit 126 may serve to drive either supporting member 130 or hanger 160, or both.

Figure 1B:
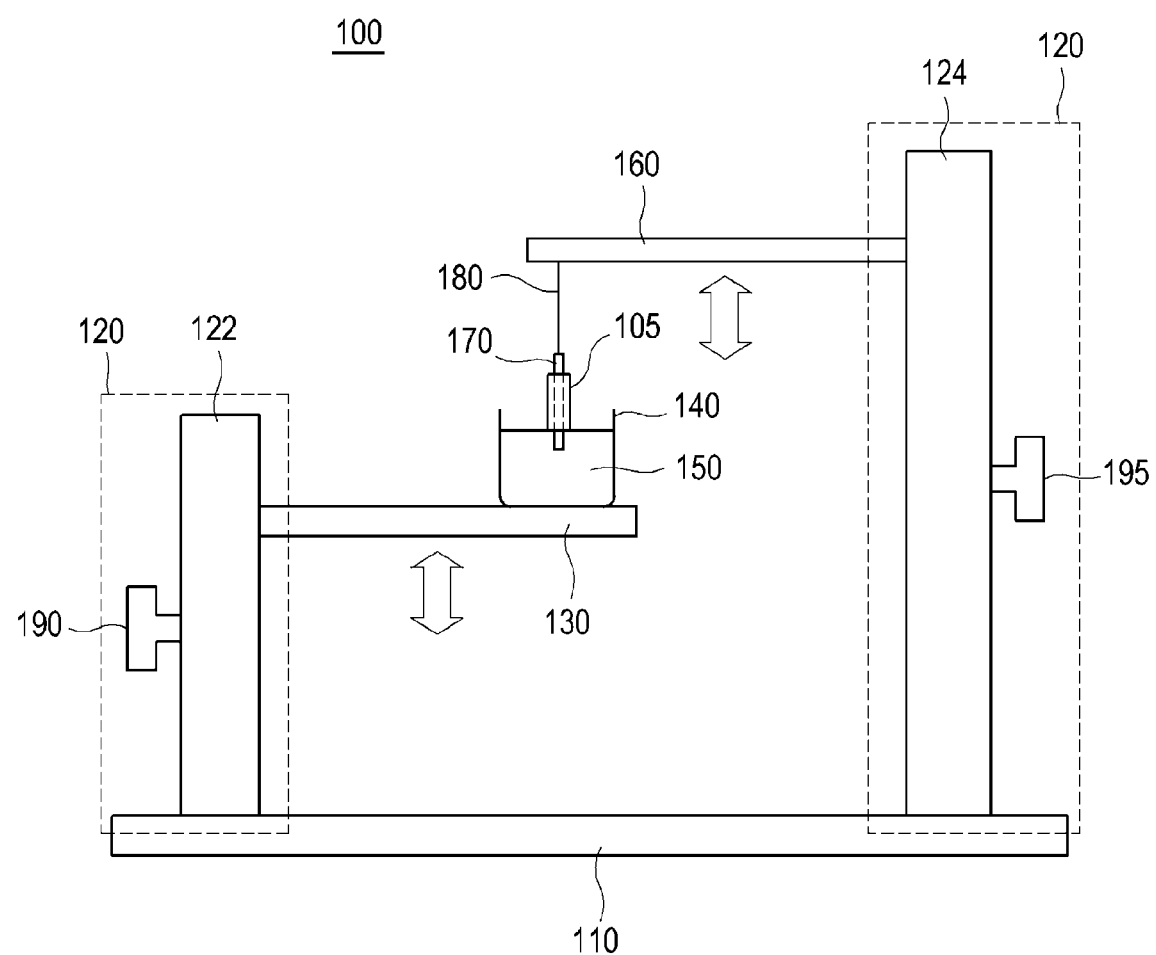

FIG. 1B shows another illustrative embodiment of apparatus 100 for forming CNT structure 105. Manipulation unit 120 may include handles 190 and 195, which may substitute for motor unit 126, first shaft 128 and second shaft 129. Handles 190 and 195 may provide manual manipulation of supporting member 130 and hanger 160, respectively. For example, handles 190, 195 may include knobs mechanically connected to left guide member 122 and/or right guide member 124 such that rotation or other manipulation of handles 190 and/or 195 causes left guide member 122 and/or right guide member 124 to dispose sacrificial element 170 substantially vertically toward container 140 for immersion of sacrificial element 170 in CNT colloidal solution 150, and to dispose sacrificial element 170 substantially vertically away from container 140 for withdrawal of sacrificial element 170 from CNT colloidal solution 150. It would be appreciated that, in some embodiments, motor unit 126 and handles 190 and/or 195 may be employed together, without departing from the scope of claimed subject matter.

In one embodiment, container 140 may have a generally rectangular solid configuration with an open top portion. Container 140 may be made of a hydrophobic material, such as fluorinated ethylene propylene (sold under the trademark Teflon), other PTFE (polytetrafluoroethylene) substances or the like. However, it would be appreciated by one of ordinary skill in the art that the above is provided only as an example, and is not intended to limit the scope of claimed subject matter.

In one embodiment, CNT colloidal solution 150 may include CNT colloids dispersed in a solvent. Concentration of the CNT colloids in CNT colloidal solution 150 may range, for example, from about 0.05 mg/ml to about 0.2 mg/ml, although claimed subject matter is not limited in this regard. CNT colloidal solution 150 may be prepared by first purifying CNTs, and then dispersing the purified CNTs in a solvent. The purification may be performed by wet oxidation in an acid solution or by dry oxidation. The solvent may be deionized water (D.I.). However, other solvents, including organic solvents such as dimethylformamide (DMF), dimethyl sulfoxide (DMSO), tetrahydrofuran (THF) or the like, may also be used without departing from the scope of claimed subject matter. Sonication treatment and/or surfactant introduction may be adopted to facilitate the dispersion process. Purified CNTs may be obtained directly and employed in place of unpurified CNTs to eliminate the need for such purification. A suitable purification method may include refluxing the nanotubes in nitric acid (e.g., at a concentration of about 2.5 M) and re-suspending the nanotubes in an alkaline solution of about pH 10 along with a surfactant (e.g., sodium lauryl sulfate), and then filtering the nanotubes with a cross-flow filtration system. The resulting purified nanotube suspension may then be passed through a filter (e.g., polytetrafluoroethylene filter).

Figure 2:
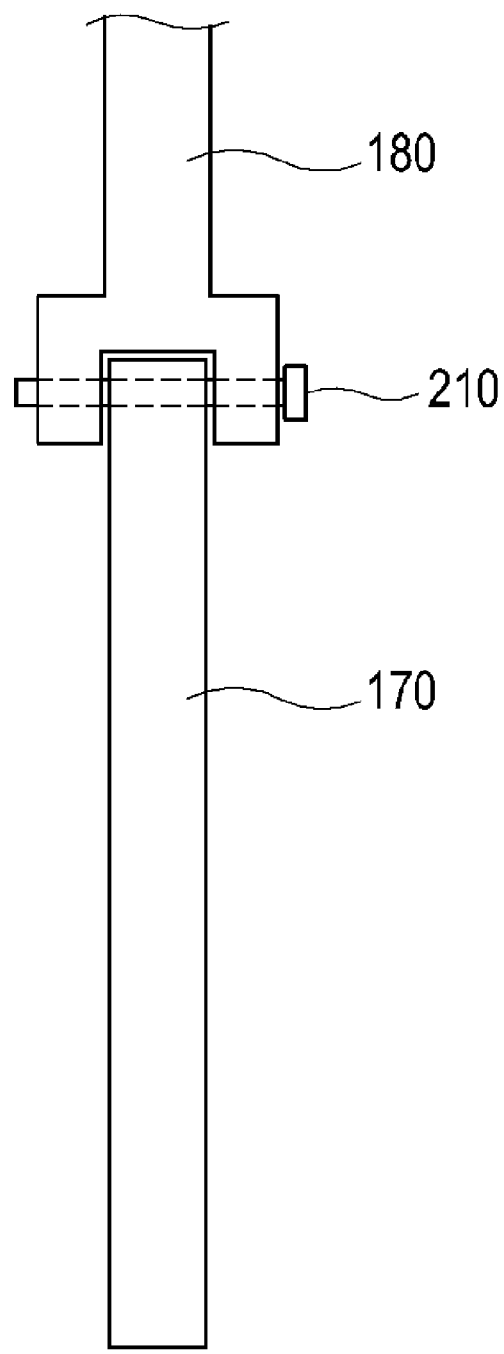
FIG. 2 shows an enlarged (not to scale) illustrative embodiment of a sacrificial element secured at a holder shown in FIGS. 1A or 1B.

Referring to FIG. 2, an illustrative embodiment of sacrificial element 170 secured at holder 180 is shown. Sacrificial element 170 may have a wire shape and configuration, although claimed subject matter is not limited in this regard. Generally, an inner diameter of a CNT pipe may depend upon the diameter of sacrificial element 170, such that the inner diameter of a CNT pipe may be substantially equal to the diameter of sacrificial element 170. For instance, if a CNT pipe with an inner diameter of about 1 mm is desirable, then a wire with the diameter of about 1 mm may be used as sacrificial element 170. However, the shape and dimensions of sacrificial element 170 is not limited to those discussed above. Depending on the desired shape of CNT structure 105, sacrificial element 170 may have a thin plate shape, a lump shape or other shapes without departing from the scope claimed of claimed subject matter. The hollow portion of CNT structure 105 may be determined based at least in part on the shape of sacrificial element 170. By way of example, in one embodiment, sacrificial element 170 having a thin plate shape may be used to produce CNT structure 105 with a hollow portion that resembles the shape of sacrificial element 170, i.e., a thin plate shape (not shown). Similarly, employing a square column shaped sacrificial element 170 may produce a structure having a square hollow portion (not shown).

In some embodiments, sacrificial element 170 may include a material that is sacrificially separable from CNT structure 105. In an illustrative embodiment sacrificial element 170 may include a polymer, e.g., a photo-sensitizer material such as those sold by Clariant Corporation® of Muttenz, Switzerland under the product names AZ1512® and AZ5214®, or the like. However, other materials, such as metal, textile fabric or the like, may also be employed without departing from the scope of claimed subject matter. Further, sacrificial element 170 may include a hydrophobic material. By way of example, in one embodiment, hydrophilic SAM (self-assembled monolayer) coating of sacrificial element 170 with $O_2$ plasma may be performed to change the surface property of sacrificial element 170 into one that is more hydrophilic.

Figure 3A:
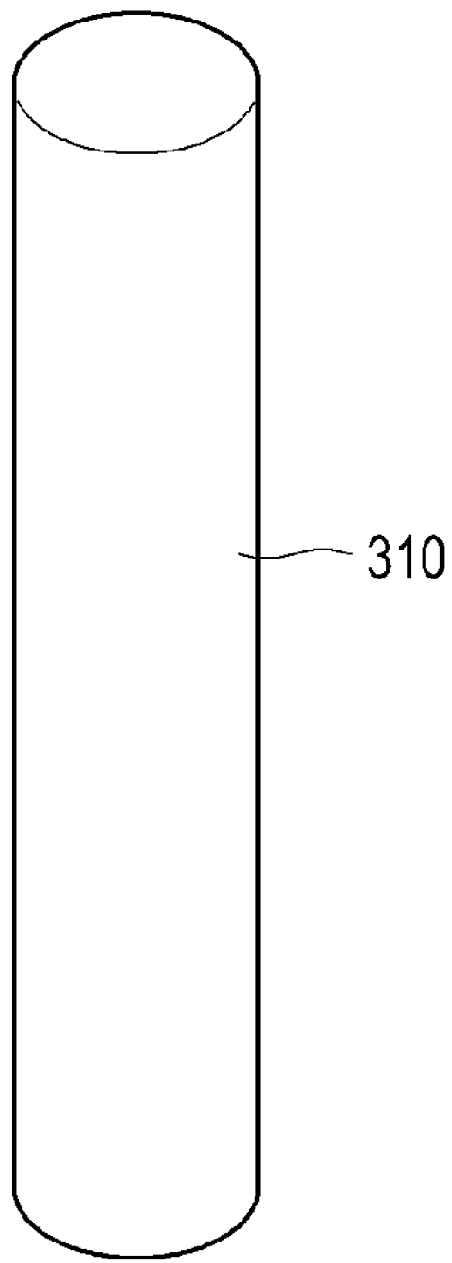
FIGS. 3A and 3B show perspective views of enlarged (not to scale) illustrative embodiments of a sacrificial element.
Figure 3B:
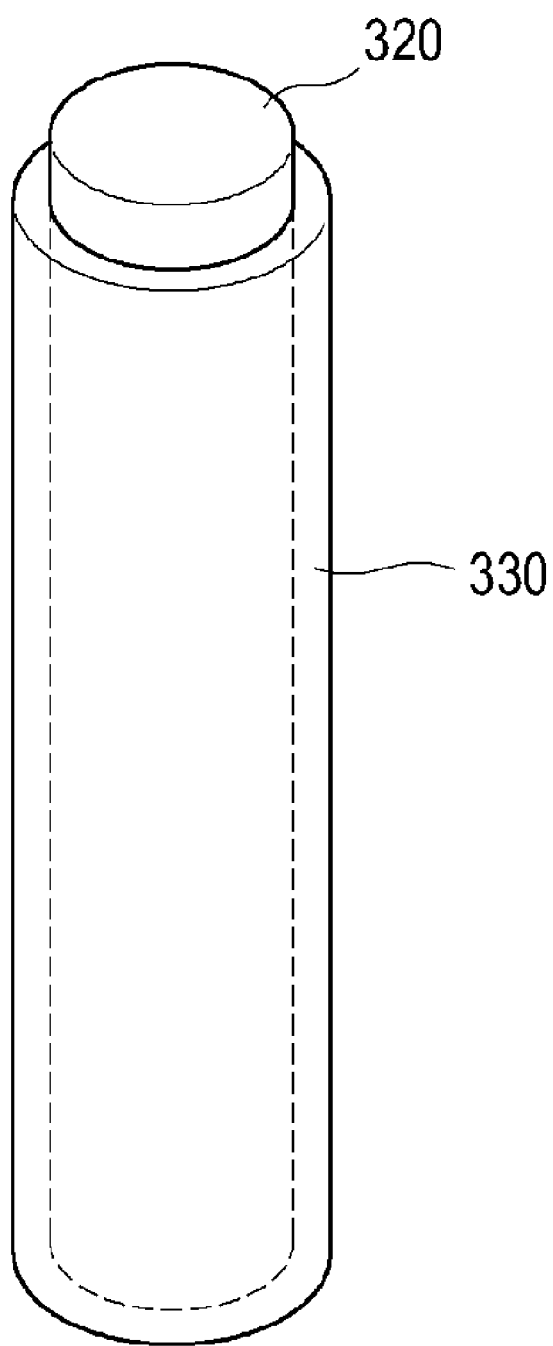

As shown in FIG. 3A, an illustrative embodiment is shown with wire-shaped sacrificial element 170 having a single body 310. The dimensions of sacrificial element 170 may generally correspond to the desired dimensions of CNT structure 105. However, in some other embodiments, sacrificial element 170 may comprise more than one portion. For instance, as shown in FIG. 3B, an illustrative embodiment of sacrificial element 170 may include an inner portion 320 and an outer portion 330 formed around inner portion 320 to expose at least a part of inner portion 320, which include different materials. Inner portion 320 and outer portion 330 may include a metal and a polymer, respectively. Such sacrificial element 170 may be formed by coupling metal inner portion 320 to holder 180, immersing metal inner portion 320 into a polymer solution, and withdrawing metal inner portion 320 from the polymer solution. As metal inner portion 320 is withdrawn from the polymer solution, metal inner portion 320 may be coated with the polymers, which form outer portion 330. As necessary, the above-mentioned hydrophilic SAM (self-assembled monolayer) coating of outer portion 330 with $O_2$ plasma may be performed thereon.

Referring again to FIG. 2, and depicted therein, in some embodiments, sacrificial element 170 may be directly secured to holder 180 by a coupling element 210. In some embodiments, coupling element 210 may include a taper, a rivet, a screw, a bolt and nut, or numerous other conceivable means suitable for securing sacrificial element 170 to holder 180.

Figure 4:
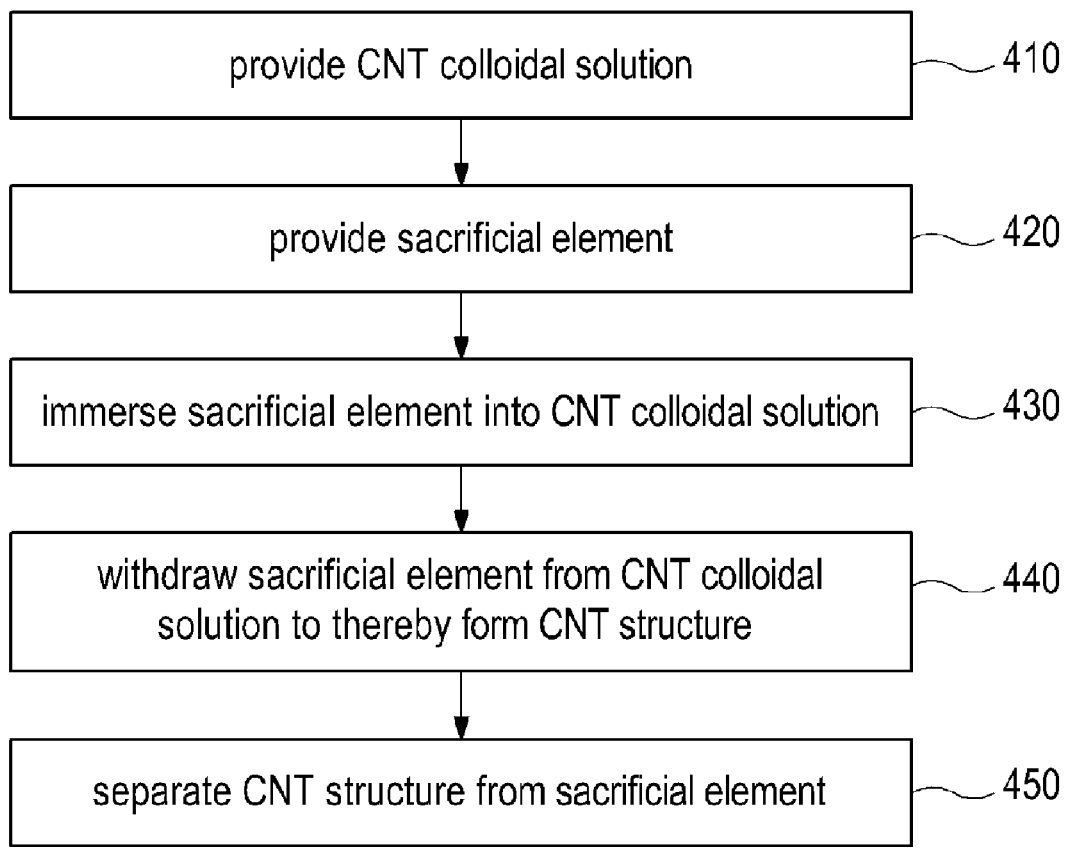
FIG. 4 shows a flowchart of an illustrative embodiment of a method for forming a CNT structure.

Referring to FIG. 4, a flowchart of an illustrative embodiment of a method for forming CNT structure 105 is shown. The method may begin at block 410 by providing CNT colloidal solution 150 in container 140 and continues to block 420 in providing sacrificial element 170. At block 430, sacrificial element 170 may be immersed into CNT colloidal solution 150. Block 430 may be undertaken by moving sacrificial element 170 substantially vertically downward toward the container 140 by operating manipulation unit 120 to allow sacrificial element 170 to be at least partially immersed into CNT colloidal solution 150. Alternatively, container 140 may be moved in a direction substantially vertically upward toward sacrificial element 170 by operating the manipulation unit 120. In still another embodiment, both sacrificial element 170 and container 140 may be concurrently moved toward each other. The operation of the manipulation unit 120 may be controlled by a computer (not shown).

Figure 5:
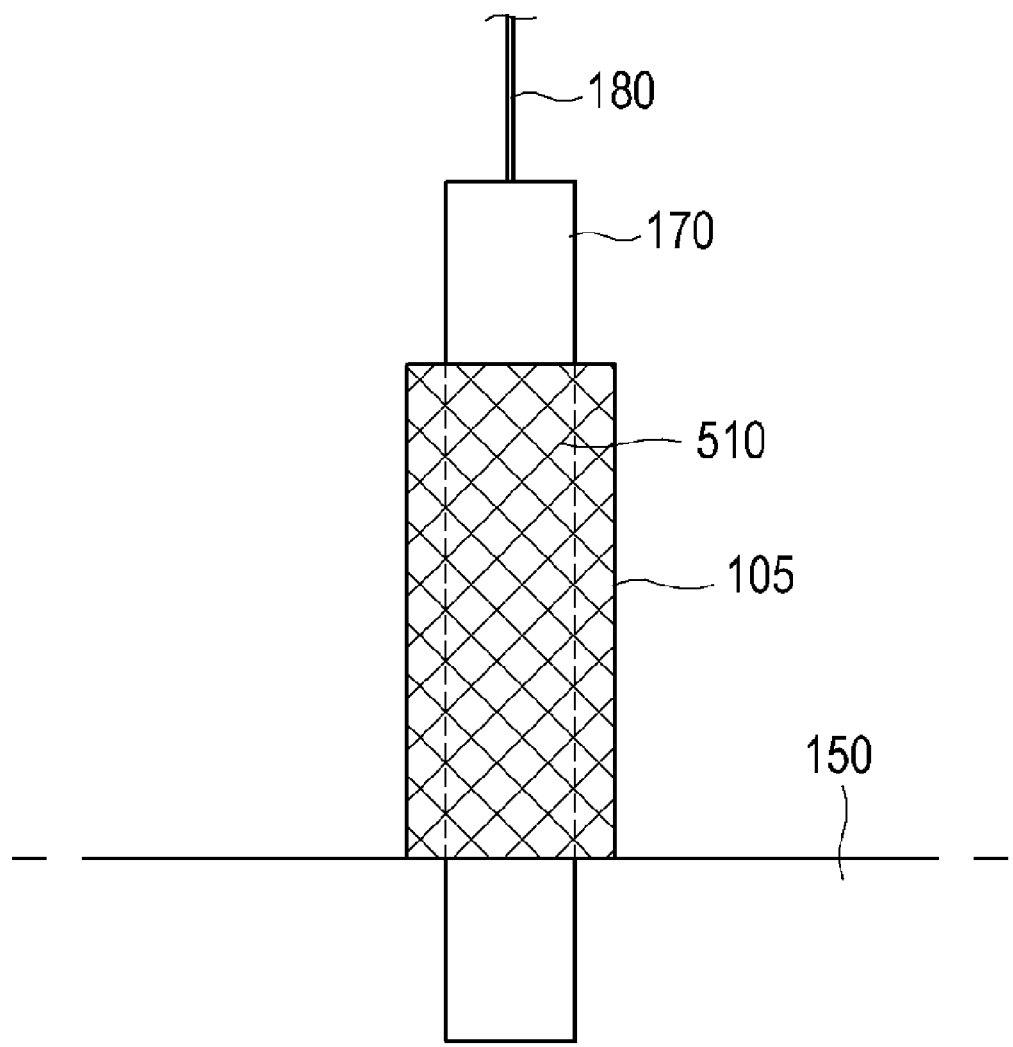
FIG. 5 shows an illustrative embodiment of a sacrificial element being withdrawn from a CNT colloidal solution and forming a CNT structure.

As set forth in block 440, sacrificial element 170 may be withdrawn from CNT colloidal solution 150. In a similar manner as above, sacrificial element 170 and/or container 140 may be controlled by operating manipulation unit 120 in order to withdraw sacrificial element 170 from CNT colloidal solution 150. The speed with which sacrificial element 170 is withdrawn from CNT colloidal solution 150 may be related to the viscosity of CNT colloidal solution 150. As the viscosity of CNT colloidal solution 150 increases or a target thickness of CNT structure 105 becomes smaller, the withdrawal speed of sacrificial element 170 may be set higher. Typically, sacrificial element 170 may be withdrawn from CNT colloidal solution 150 with a speed ranging from about 0.3 mm/min to about 3 mm/min. A sensor (not shown) may be used to determine the specific speed by which sacrificial element 170 is withdrawn from CNT colloidal solution 150. As sacrificial element 170 is withdrawn from CNT colloidal solution 150 in block 440, a plurality of CNTs 510 may adhere to sacrificial element 170 and to each other to form CNT structure 105 around sacrificial element 170, as shown in FIG. 5. As further shown in FIG. 5, CNT structure 105 is progressively formed around sacrificial element 170 as it is withdrawn from CNT colloidal solution 150.

Referring again to FIG. 4, in block 450, CNT structure 105 may then be separated from the sacrificial element 170. If sacrificial element 170 includes a polymer, CNT structure 105 may be separated from sacrificial element 170 by, e.g., immersing CNT structure 105 and sacrificial element 170 into a solution, such as an acetone solution (not shown). In such a case, the acetone solution may serve to at least partially dissolve sacrificial element 170 leaving CNT structure 105. If sacrificial element 170 includes metal inner portion 320 and polymer outer portion 330 as shown in FIG. 3B, immersion of sacrificial element 170 into an acetone solution may separate CNT structure 105 and metal inner portion 320 from polymer outer portion 330. In some implementations, an acetone solution may not substantially sacrifice metal inner portion 320, thereby allowing metal inner portion 320 to be reusable. It may be appreciated that the separation may be performed in various ways depending on the material selection of sacrificial element 170. CNT structure 105 may also be dried before separation from sacrificial element 170.

Figure 6:
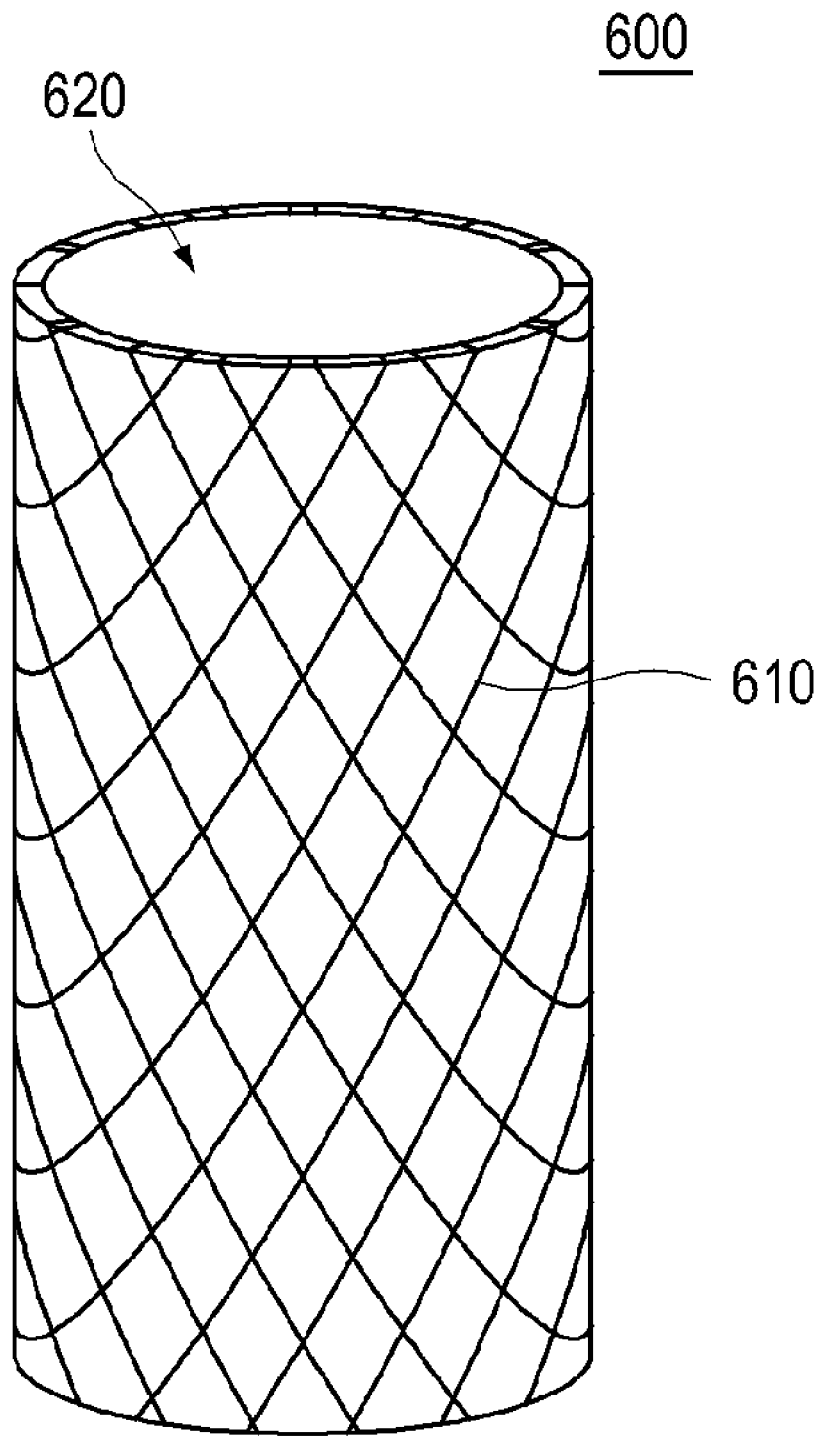
FIG. 6 shows an enlarged (not to scale) illustrative embodiment of a CNT structure.

In one illustrative embodiment, after separation from sacrificial element 170, CNT structure 105 may be formed as a CNT pipe 600 that includes a plurality of CNTs 610 networked in the shape and configuration of a cylinder defining a hollow cavity 620, as shown in FIG. 6. CNT pipe 600 may be formed by using sacrificial element 170 having a wire-like shape and configuration.

For this and other processes and methods disclosed herein, one skilled in the art will appreciate that the functions performed in the processes and methods may be implemented in a different order. Further, the outlined steps and operations are only provided as examples. That is, some of the steps and operations may be optional, combined into fewer steps and operations, or expanded into additional steps and operations without detracting from the spirit and scope of the disclosed embodiments.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for forming a carbon nanotube (CNT) structure comprising:
providing a CNT colloidal solution including carbon nanotubes (CNTs); providing a sacrificial element; immersing the sacrificial element into the CNT colloidal solution to form a CNT structure on the sacrificial element; withdrawing the sacrificial element from the CNT colloidal solution, wherein the sacrificial element is substantially vertically withdrawn relative to the CNT colloidal solution at a speed ranging from about 0.3 mm/min to about 3 mm/min; and separating the CNT structure from the sacrificial element, wherein after separation, the formed CNT structure remains, and wherein separating the CNT structure comprises destroying at least part of a surface of the sacrificial element contacting the CNT structure.

2. The method of claim 1, wherein the CNT colloidal solution comprises about 0.05 mg/mL to about 0.2 mg/mL CNT dispersed in a solvent.

3. The method of claim 1, wherein the sacrificial element includes a polymer.

4. The method of claim 3, wherein the polymer includes a photo-sensitizer material.

5. The method of claim 3, wherein the sacrificial element includes a SAM (self-assembled monolayer) coating.

6. The method of claim 3, wherein destroying at least part of a surface of the sacrificial element comprises at least partially dissolving the sacrificial element.

7. The method of claim 6, wherein at least partially dissolving the sacrificial element comprises contacting the CNT structure and the sacrificial element with an acetone solution.

8. The method of claim 3, wherein the sacrificial elements comprises an inner metal portion and an outer polymer portion.

9. The method of claim 1, wherein the formed CNT structure comprises a hollow portion defined by the shape of the sacrificial element.

10. The method of claim 1, wherein the sacrificial element is a cylinder.

11. The method of claim 1, where the sacrificial element is a plate.

12. The method claim 1, wherein the CNT structure is dried before separation.

13. The formed CNT structure prepared according to claim 1.

14. A method for forming a carbon nanotube (CNT) structure comprising:
forming the CNT structure, wherein forming the CNT structure comprises:

immersing the sacrificial element into the CNT colloidal solution to form a CNT structure on the sacrificial element, and withdrawing the sacrificial element from the CNT colloidal solution wherein the sacrificial element is substantially vertically withdrawn relative to the CNT colloidal solution at a speed ranging from about 0.3 mm/min to about 3 mm/min and separating the CNT structure from the sacrificial element, wherein after separation, the formed CNT structure remains, and wherein separating the CNT structure comprises destroying at least part of a surface of the sacrificial element contacting the CNT structure.

15. The method of claim 14, wherein the CNT structure forms as the sacrificial element is withdrawn.

16. The method of claim 14, wherein the CNT colloidal solution comprises about 0.05 mg/mL to about 0.2 mg/mL CNT dispersed in a solvent.

17. The method of claim 14, wherein the sacrificial element includes a polymer.

18. The method of claim 17, wherein the polymer includes a photo-sensitizer material.

19. The method of claim 18, wherein the sacrificial element includes a SAM (self-assembled monolayer) coating.

20. The method of claim 17, wherein destroying at least part of a surface of the sacrificial element comprises at least partially dissolving the sacrificial element.

21. The method of claim 17, wherein at least partially dissolving the sacrificial element comprises contacting the CNT structure and the sacrificial element with an acetone solution.

22. The method of claim 17, wherein the sacrificial elements comprises an inner metal portion and an outer polymer portion.

23. The method of claim 14, wherein the formed CNT structure comprises a hollow portion defined by the shape of the sacrificial element.

24. The method of claim 14, wherein the sacrificial element is a cylinder.

25. The method of claim 14, where the sacrificial element is a plate.

26. The method claim 14, wherein the CNT structure is dried before separation.

27. The formed CNT structure prepared according to claim 14.

* * * * *

UNITED STATES PATENT AND TRADEMARK OFFICE
CERTIFICATE OF CORRECTION

| | | |
|---|---|---|
| PATENT NO. | : 7,959,842 B2 | Page 1 of 1 |
| APPLICATION NO. | : 12/198835 | |
| DATED | : June 14, 2011 | |
| INVENTOR(S) | : Kim et al. | |

It is certified that error appears in the above-identified patent and that said Letters Patent is hereby corrected as shown below:

Title Page, Item (73), under "Assignee", in Column 1, Line 1, delete "SNU & R&DB" and insert -- SNU R&DB --, therefor.

Title Page 2, Item (56), under "OTHER PUBLICATIONS", in Column 1, Line 31, delete "functonalize" and insert -- functionalize --, therefor.

Title Page 2, Item (56), under "OTHER PUBLICATIONS", in Column 1, Line 32, delete "Physicas" and insert -- Physics --, therefor.

In Column 1, Line 48, delete "1A or 1B." and insert -- 1A and 1B. --, therefor.

In Column 1, Line 62, delete "hereof" and insert -- hereof. --, therefor.

In Column 6, Line 58, in Claim 11, delete "where" and insert -- wherein --, therefor.

In Column 6, Line 60, in Claim 12, delete "method claim" and insert -- method of claim --, therefor.

In Column 7, Line 7, in Claim 14, delete "3 mm/min" and insert -- 3 mm/min; --, therefor.

In Column 8, Line 16, in Claim 25, delete "where" and insert -- wherein --, therefor.

In Column 8, Line 18, in Claim 26, delete "method claim" and insert -- method of claim --, therefor.

Signed and Sealed this
Twelfth Day of June, 2012

David J. Kappos
*Director of the United States Patent and Trademark Office*